United States Patent
Meyer et al.

(10) Patent No.: US 10,836,372 B2
(45) Date of Patent: Nov. 17, 2020

(54) SYSTEM AND METHOD FOR CONTROLLING A HYBRID VEHICLE IN PARK OR NEUTRAL

(71) Applicant: Ford Global Technologies, LLC, Dearborn, MI (US)

(72) Inventors: Jason Meyer, Canton, MI (US); Rajit Johri, Canton, MI (US); Mark Steven Yamazaki, Canton, MI (US); Mathew Alan Boesch, Plymouth, MI (US); Chen Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 15/246,064

(22) Filed: Aug. 24, 2016

(65) Prior Publication Data
US 2018/0056974 A1 Mar. 1, 2018

(51) Int. Cl.
*B60W 10/10* (2012.01)
*B60W 10/08* (2006.01)
(Continued)

(52) U.S. Cl.
CPC .............. *B60W 20/13* (2016.01); *B60K 6/48* (2013.01); *B60W 10/023* (2013.01); *B60W 10/026* (2013.01); *B60W 10/06* (2013.01); *B60W 10/08* (2013.01); *B60W 20/00* (2013.01); *B60W 30/18054* (2013.01); *B60K 2006/4825* (2013.01); *B60W 2510/0233* (2013.01); *B60W 2510/101* (2013.01); *B60W 2510/244* (2013.01);
(Continued)

(58) Field of Classification Search
CPC ....... B60W 2510/244; B60W 2540/10; B60W 2540/103; B60W 10/04; B60W 10/06
USPC ......................... 701/22; 180/65.265; 903/930
See application file for complete search history.

(56) References Cited

U.S. PATENT DOCUMENTS 5,842,534 A 12/1998 Frank
6,405,818 B1 6/2002 Anthony et al.
(Continued)

OTHER PUBLICATIONS

An abstract of course: "Hybrid Electric Vehicles: Exploring the Electronic CVT" by Dr. John M Miller, IEEE, Year: 2005.*
(Continued)

*Primary Examiner* — Cuong H Nguyen
(74) *Attorney, Agent, or Firm* — Brooks Kushman PC; David Kelley (57) ABSTRACT

A hybrid vehicle control system and method include a controller programmed to, while a transmission is in PARK or NEUTRAL, start an engine, close a disconnect clutch selectively coupling the engine to an electric machine, and control the electric machine to charge a traction battery in response to the accelerator pedal position exceeding an idle position and being less than a threshold. The controller controls transmission impeller speed in response to accelerator pedal position exceeding the threshold to allow revving the engine in response to accelerator pedal. A method for controlling a hybrid vehicle includes starting an engine, closing a clutch between the engine and an electric machine, and controlling the engine and the electric machine to either: i) charge a traction battery or ii) rev the engine based on accelerator pedal position relative to a threshold above an idle position while the transmission is in PARK or NEUTRAL.

18 Claims, 4 Drawing Sheets

(51) Int. Cl.
*B60W 20/13* (2016.01)
*B60W 10/02* (2006.01)
*B60W 30/18* (2012.01)
*B60W 20/00* (2016.01)
*B60K 6/48* (2007.10)
*B60W 10/06* (2006.01)

(52) U.S. Cl.
CPC ... *B60W 2540/10* (2013.01); *B60W 2540/103* (2013.01); *B60W 2710/024* (2013.01); *B60W 2710/0644* (2013.01); *B60W 2710/0666* (2013.01); *B60W 2710/081* (2013.01); *Y02T 10/62* (2013.01); *Y10S 903/93* (2013.01)

(56) References Cited

U.S. PATENT DOCUMENTS

| | | | |
|---|---|---|---|
| 6,549,840 B1* | 4/2003 | Mikami | B60W 10/06 701/69 |
| 8,118,132 B2 | 2/2012 | Gray, Jr. | |
| 8,480,523 B2 | 7/2013 | Fuechtner | |
| 8,583,309 B2* | 11/2013 | Kaita | B60L 15/20 701/22 |
| 9,550,488 B1* | 1/2017 | Johri | B60W 10/08 |
| 9,604,628 B2* | 3/2017 | Wang | B60W 10/02 |
| 9,679,486 B2* | 6/2017 | Li | G08G 1/145 |
| 2010/0063704 A1* | 3/2010 | Okubo | B60W 20/00 701/99 |
| 2012/0226406 A1* | 9/2012 | Kaita | B60L 15/20 701/22 |
| 2013/0124067 A1* | 5/2013 | Gibson | F02D 13/0261 701/103 |
| 2013/0158838 A1* | 6/2013 | Yorke | B60W 30/18018 701/103 |
| 2014/0138172 A1* | 5/2014 | Suzuki | B60K 6/365 180/65.21 |
| 2015/0203091 A1* | 7/2015 | Wang | B60W 10/06 701/22 |
| 2015/0344020 A1* | 12/2015 | Kato | B60W 20/10 701/22 |
| 2016/0200315 A1* | 7/2016 | Fracchia | B60W 10/06 701/22 |
| 2017/0145933 A1* | 5/2017 | Dudar | B60K 6/24 |
| 2017/0341501 A1* | 11/2017 | Holmes | B60K 6/40 |
| 2018/0194341 A1* | 7/2018 | Owen | B60W 10/22 |

OTHER PUBLICATIONS

Design and Analysis of a Novel Multimode Transmission for a HEV Using a Single Electric Machine; Futang Zhu ; Li Chen ; Chengliang Yin; IEEE Transactions on Vehicular Technology; vol. 62, Issue: 3; IEEE Journal Article (Year 2013).*

Analysis and simulation of a novel HEV using a single electric machine; Futang Zhu ; Chengliang Yin ; Li Chen ; Cunlei Wang; 2013 World Electric Vehicle Symposium and Exhibition (EVS27); IEEE Conference Paper (Year 2013).*

* cited by examiner

SYSTEM AND METHOD FOR CONTROLLING A HYBRID VEHICLE IN PARK OR NEUTRAL

TECHNICAL FIELD

The present disclosure relates to hybrid vehicles and methods of controlling operation of an engine and an electric machine with a Park or Neutral gear selected.

BACKGROUND

Hybrid vehicles are generally designed to improve efficiency of fuel use relative to a conventional powertrain that relies solely on an internal combustion engine to power the vehicle. However, some drivers have resisted hybrid vehicles due to actual or perceived differences in drivability of early hybrid implementations relative to a more familiar conventional powertrain. For example, hybrid vehicles may automatically control operation of the engine and electric machine, starting and stopping the engine and selecting whether torque is provided by the engine, electric machine, or both based on current vehicle and ambient operating conditions. Some hybrid vehicle operators may want more manual control over the vehicle than otherwise available in some hybrid vehicle control systems. For example, the driver may want the ability to rev the engine or to shift the transmission while revving the engine to perform a neutral drop or drive slam engagement, or to increase engine speed to charge the traction battery.

SUMMARY

In one embodiment, a vehicle having an engine, an electric machine, a traction battery, and a step-ratio transmission includes a controller programmed to, while the transmission is in PARK or NEUTRAL, start the engine and control engine torque responsive to accelerator pedal position exceeding idle position and being below a threshold to drive the electric machine to charge the battery, and control engine speed responsive to the accelerator pedal position being above the threshold to rev the engine. The vehicle may include a clutch disposed between the engine and the electric machine with the controller further programmed to at least partially engage or lock the clutch responsive to the accelerator pedal position exceeding the idle position. The controller may be programmed to engage the clutch after the engine starts, which may be determined by engine speed exceeding an associated starting threshold engine speed. The controller may be further programmed to stop the engine in response to accelerator pedal position returning to the idle position for a predetermined period of time. The predetermined period of time may be shorter if the brake pedal is depressed. The controller may also be programmed to control the engine torque based on a battery state of charge (SOC) while the accelerator pedal position is below the threshold, and to control transmission torque converter impeller speed based on the accelerator pedal position while the accelerator pedal position exceeds the threshold. The control may control impeller speed by controlling at least one of engine speed and motor speed while the accelerator pedal position exceeds the threshold.

Various embodiments may include a vehicle control system having a controller programmed to, while a transmission is in PARK or NEUTRAL, start an engine, close a disconnect clutch selectively coupling the engine to an electric machine, and control the electric machine to charge a traction battery in response to the accelerator pedal position exceeding an idle position and being less than a threshold. The control system may control transmission torque converter impeller speed in response to accelerator pedal position exceeding the threshold.

A method for controlling a vehicle having an engine, a step-ratio transmission, an electric machine, and a battery, according to various embodiments may include starting the engine, closing a clutch between the engine and the electric machine, and controlling the engine and the electric machine to either: i) charge the battery or ii) rev the engine based on accelerator pedal position relative to a threshold above an idle position while the transmission is in PARK or NEUTRAL. The method may also include controlling the engine and the electric machine based on a target torque converter impeller speed to provide increased launch torque in the event of a neutral drop or drive-slam transmission engagement. The method may also include stopping the engine after the accelerator pedal position remains at the idle position for a predetermined period of time. The predetermined period of time may be based on brake pedal position with a shorter time period when the brake pedal is pressed. The method may include operating the engine in a torque control mode while charging the battery and a speed control mode while revving the engine. In one embodiment, the method includes controlling the engine and the electric machine to charge the battery while the accelerator pedal position is less than the threshold. and controlling the engine and the electric machine to either charge the battery or rev the engine based on a rate of change of the accelerator pedal position.

Embodiments according to the disclosure may provide one or more advantages. For example, systems or methods for a hybrid vehicle having a step-ratio transmission according to various embodiments allow the driver additional control of the powertrain including enhanced control of engine speed and traction battery charging while the transmission is in park or neutral. Various embodiments interpret accelerator pedal position and/or rate of change of position based on a gear selector for a step-ratio transmission selecting park or neutral to facilitate engine speed control or torque control in response to accelerator pedal position. Similarly, one or more electric machines may be operated in a torque control mode or speed control mode based on accelerator pedal position while the gear selector is in park or neutral to modify traction battery charging subject to operating condition limits. Hybrid vehicle control according to various embodiments allows driver control of engine revving, transmission shifting or engagement with engine speed or impeller speed above idle speed, and battery charging with engine speed above idle speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
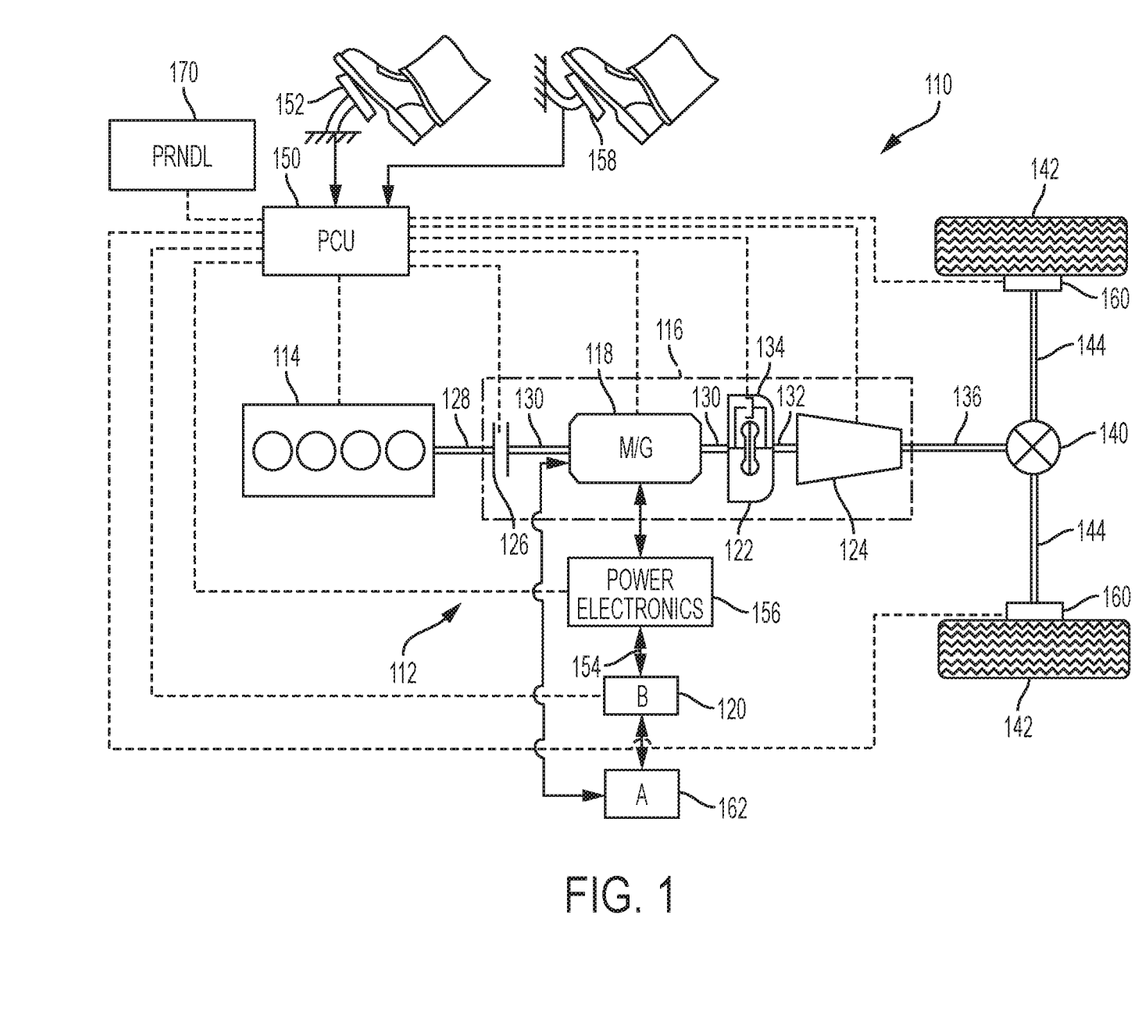
FIG. 1 is a schematic illustration of a representative embodiment of a powertrain of a hybrid electric vehicle.

Referring to FIG. 1, a schematic diagram of a hybrid electric vehicle (HEV) 110 is illustrated having accelerator pedal control of the powertrain while in park or neutral according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 may include an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine. The engine 114 generates an engine power and corresponding engine torque that is supplied to the M/G 18 when a disconnect clutch 126 between the engine 114 and the M/G 118 is at least partially engaged. The engine 114 may be operated in a closed-loop speed control mode or torque control mode. The M/G 118 may be implemented by any one of a plurality of types of electric machines. For example, M/G 118 may be a permanent magnet synchronous motor. The M/G 118 may be operated in a closed-loop speed control mode or torque control mode. Power electronics 156 condition direct current (DC) power provided by the battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the battery 120. The disconnect clutch 126 can also be disengaged to isolate the engine 114 from the remainder of the powertrain 112 such that the M/G 118 can act as the sole drive source for the HEV 110. Shaft 130 extends through the M/G 118. The M/G 118 is continuously drivably connected to the shaft 130, whereas the engine 114 is drivably connected to the shaft 130 only when the disconnect clutch 126 is at least partially engaged.

The M/G 118 is connected to the torque converter 122 via shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different forward and reverse gear ratios by selective engagement of friction elements such as clutches and brakes (not shown) to establish the desired multiple discrete or step drive ratios. The gearbox 124 also includes a park position that engages a pawl with a corresponding gear to mechanically lock the transmission. A gear selector 170 may be used to select park (P) or neutral (N), or a corresponding gear or gear range, such as reverse (R), drive (D), low (L), manual (M), etc. The friction elements are controllable through a shift schedule to control the ratio between a transmission output shaft 136 and the transmission input shaft 132. The gearbox 124 may be automatically shifted from one ratio to another based on various vehicle and ambient operating conditions by an associated controller, such as a powertrain control unit (PCU). Alternatively, gear selector 170 may be used in a manual mode (M) to request a desired gear with the ultimate gear selection controlled by PCU 150 based on current operating conditions. Power and torque from both the engine 114 and the M/G 118 may be delivered to gearbox 124. The gearbox 124 then provides powertrain output power and torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example, and do not include a torque converter.

As shown in the representative embodiment of FIG. 1, the output shaft 136 is connected to a differential 140. The differential 140 drives a pair of wheels 142 via respective axles 144 connected to the differential 140. The differential transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 112 further includes an associated controller 150 such as a powertrain control unit (PCU). While illustrated as one controller, the controller 150 may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 150 may communicate signals to and/or from engine 114, disconnect clutch 126, M/G 118, battery 120, launch clutch 134, transmission gearbox 124, and power electronics 156. Although not explicitly illustrated, those of ordinary skill in the art will recognize various functions or components that may be controlled by controller 150 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), battery temperature, voltage, current, or state of charge (SOC) for example.

Control logic, functions, or algorithms performed by controller 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle. In general, depressing and releasing the accelerator pedal 152 generates an accelerator pedal position signal that may be interpreted by the controller 150 as a demand for increased power or decreased power, respectively. Release of accelerator pedal 152 may be interpreted differently depending on the particular operating mode.

In various prior art implementations of a hybrid vehicle having a step-ratio transmission, driver requests are interpreted by a Vehicle System Control (VSC) as implemented by PCU 150 in the representative embodiment of FIG. 1. Driver requests may include gear selection (PRNDL) via selector 170 and accelerator pedal position sensor (APPS)

152 to interpret the driver intent with respect to wheel torque. The driver input from the brake pedal position sensor (BPPS) 158 is interpreted by a Brake System Control Module (BSCM, not specifically illustrated) and a wheel torque modification request is sent to the VSC to adjust the final wheel torque. A high voltage battery energy controller (BECM, not specifically illustrated) monitors various battery operating parameters such as battery temperature, voltage, current, and SOC and determines an associated allowable discharge power limit and allowable charge power limit. The VSC determines the powertrain operating point to maintain battery state of charge, minimize fuel consumption, and deliver the driver demanded vehicle operation. A Torque Control (TC) feature or module inside the VSC determines torque provided by the engine 114 and M/G 118.

During operation of various prior art implementations of a hybrid vehicle having a step-ratio transmission, the impeller of torque converter 122 is stopped when the transmission gear selector 170 is in park or neutral. This does not allow the driver to operate the powertrain in a similar manner to a conventional vehicle with respect to raising impeller speed prior to engaging the transmission to provide additional launch torque or to spin or squeal the tires. As described in greater detail below, various embodiments according to the disclosure use position of accelerator pedal 152 to control rotational speed of engine 114 for charging of traction battery 120 and engine speed revving while the transmission 116 is in park or neutral, which may be determined based on position of gear selector 170, for example. When the accelerator pedal 152 is not applied, both the engine 114 and M/G 118 can be stopped such that the impeller of torque converter 122 is also stopped. Lightly applying the accelerator pedal 152 below an associated threshold position can be interpreted by controller 150 as a pull-up or start request for engine 114 and the system can start the engine 114 and lock the upstream or disconnect clutch 126. One of the torque actuators can be operated in a speed control mode (typically the M/G 118) and the other actuator can be operated in a torque control mode (typically engine 114). The amount of charging torque used for charging battery 120 can be limited to a narrow range while the accelerator pedal 152 is lightly applied. The actual amount of battery charging may depend on the battery state of charge (SOC) and various other battery operating parameters. As the accelerator pedal position increases, the maximum charging torque can be increased while the accelerator pedal position or rate of change remains below an associated threshold. This provides the driver the ability to more quickly charge the traction battery 120. The actual charging rate may be determined by the battery energy management strategy. The impeller speed target may be increased in response to an accelerator pedal position or rate exceeding an associated threshold to provide the ability for a "slam" engagement of the transmission gearbox 124 into a forward or reverse driving gear based on position of gear selector 170.

As also shown in FIG. 1, a brake pedal 158 may be used by the driver to provide a demanded braking torque to slow the vehicle. In general, depressing and releasing the brake pedal 158 generates a brake pedal position signal that may be interpreted by the controller 150 as a demand to decrease the vehicle speed. Based upon inputs from the accelerator pedal 152 and brake pedal 158, the controller 150 commands the torque to the engine 114 and M/G 118, and controls friction brakes 160. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle with the M/G 118 as the sole power source, the power flow remains the same except the disconnect clutch 126 isolates the engine 114 from the remainder of the powertrain 112. Combustion in the engine 114 may be disabled or otherwise OFF during this time to conserve fuel. The traction battery 120 transmits stored electrical energy through wiring 154 to power electronics 156 that may include an inverter, for example. The power electronics 156 convert DC voltage from the battery 120 into AC voltage to be used by the M/G 118. The controller 150 commands the power electronics 156 to convert voltage from the battery 120 to an AC voltage provided to the M/G 118 to provide positive or negative torque to the shaft 130. This operation mode may be referred to as an "electric only" or "EV" operation mode.

In any mode of operation, the M/G 118 may act as a motor and provide a driving force for the powertrain 112. Alternatively, the M/G 118 may act as a generator and convert kinetic energy from the powertrain 12 into electric energy to be stored in the battery 120. The M/G 118 may act as a generator while the engine 114 is providing propulsion power for the vehicle 110, for example. The M/G 118 may additionally act as a generator during times of regenerative braking in which torque and rotational (or motive) energy or power from spinning wheels 142 is transferred back through the gearbox 124, torque converter 122, (and/or torque converter bypass clutch 134) and is converted into electrical energy for storage in the battery 120. The M/G 118 may be operated in a torque control mode to provide a target or requested output torque, or in a speed control mode to provide a target or requested output speed.

The battery 120 and the M/G 118 may also be configured to provide electrical power to one or more vehicle accessories 162. The vehicle accessories 162 may include, but are not limited to, air conditioning systems, power steering systems, electric heaters, or any other system or device that is electrically operated.

It should be understood that the schematic illustrated in FIG. 1 is merely representative and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

Figure 2:
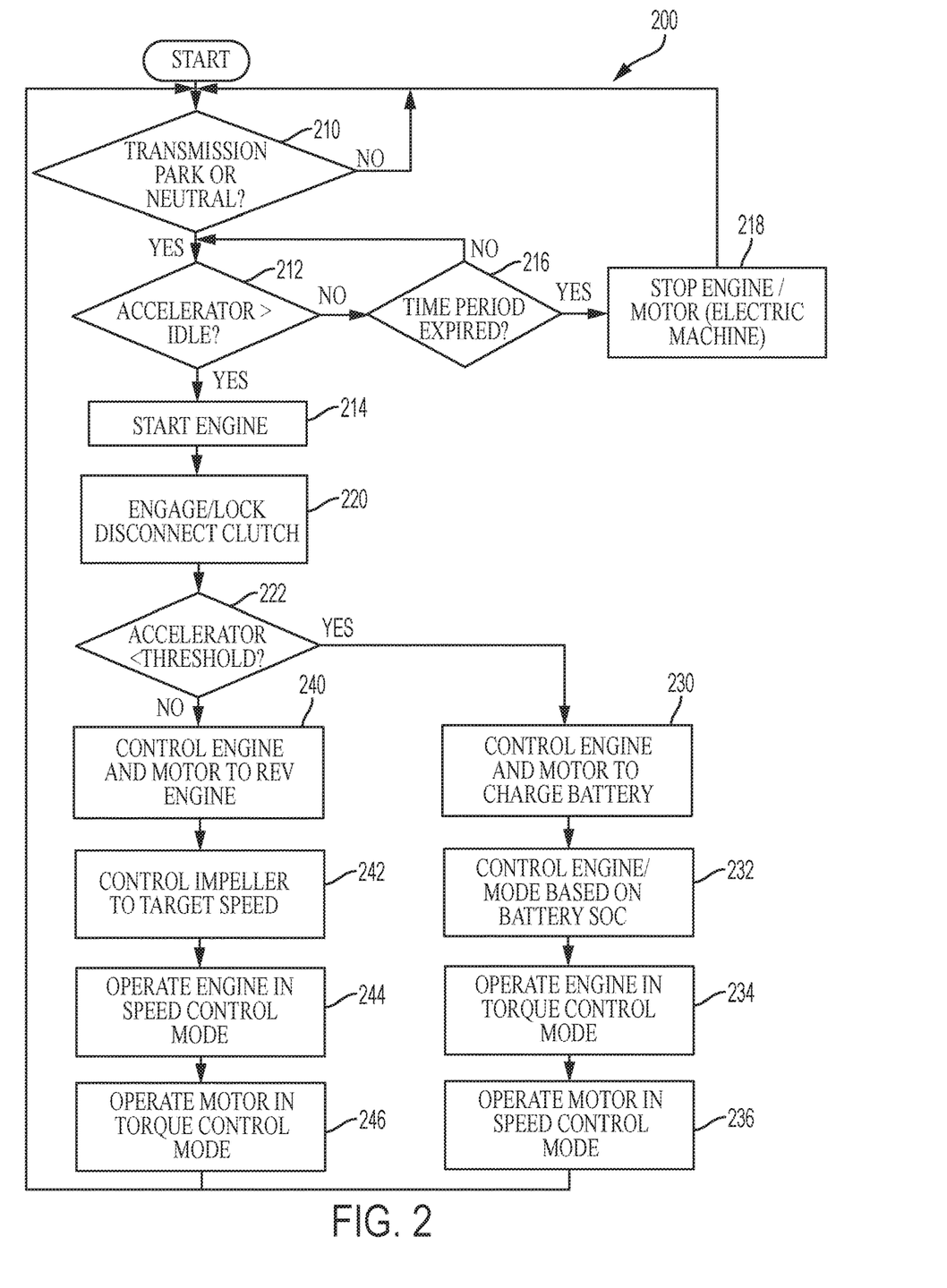
FIG. 2 is a flowchart illustrating operation of a representative embodiment of a system or method for controlling a hybrid vehicle to provide accelerator pedal position interpretation based on a transmission gear selector position.

FIG. 2 is a flowchart illustrating operation of a representative system or method for controlling a hybrid vehicle to provide accelerator pedal position interpretation based on a transmission gear selector position or corresponding transmission gear state. As previously described, a control algorithm as represented by flowchart 200 may be implemented by one or more controllers or processors, such as controller 150 (FIG. 1), for example. Block 210 determines whether the transmission is in a PARK or NEUTRAL gear state. Various sensors may be used to determine whether the transmission is in PARK or NEUTRAL depending on the particular application. In one embodiment, a gear selector position or state may be used to determine whether a PARK or NEUTRAL gear or gear state has been selected.

In response to accelerator pedal position being greater than an idle position at 212, an engine start or pull-up request is made to start the engine as indicated at 214. If the accelerator pedal position returns to the idle or fully released position as indicated at 212 for a predetermined time period as indicated at 216, the engine is stopped as indicated at 218. The predetermined period of time may be adjusted based on position of the brake pedal. For example, a shorter period of time may be used when the brake pedal is depressed, i.e. brake pedal position exceeds a corresponding threshold. Similarly, idle position of the accelerator pedal may be determined based on one or more thresholds that may be used to provide hysteresis and to account for variability associated with manufacturing tolerances or changes in mechanical or electrical components over time. In one embodiment, idle position corresponds to an accelerator pedal position with an associated pedal position sensor signal below a corresponding threshold. In one or more embodiments, the motor (or electric machine as implemented by M/G 118 in FIG. 1) may also be stopped as indicated at 218.

After starting the engine at 214, an upstream or disconnect clutch that selectively couples the engine to the motor may be at least partially locked or engaged as indicated at 220 so that the engine drives the motor to provide torque for charging the battery or to attain a target impeller speed as described below. An engine start may be determined based on engine speed exceeding a minimum starting threshold for a predetermined period of time.

If the accelerator pedal position exceeds the idle position at 212 and is less than a threshold as indicated at 222, the engine and motor are controlled to charge the traction battery as represented at 230. Accelerator pedal position may also be used to determine or calculate a rate of change of position with the rate of change compared to a corresponding threshold at 212 in some embodiments. The engine and motor may be controlled based on a current traction battery state of charge (SOC) as indicated at 232. Battery charging may be controlled based on various other battery operating parameters such as temperature, charging current limit, etc. In one embodiment, the engine is operated in a torque control mode as represented at 234 and the motor is operated in a speed control mode as indicated at 236. As generally understood by those of ordinary skill in the art, operation in a torque control mode attempts to produce a target output torque and may increase or decrease speed to produce the target output torque. Similarly, operation in a speed control mode attempts to produce a target output speed and may increase or decrease torque to achieve the target output speed.

The engine and motor are controlled to rev the engine as indicated at 240 in response to accelerator pedal position exceeding the threshold at 222, i.e. accelerator pedal position is not less than the threshold. As previously described, accelerator pedal position rate of change may be used in place of, or in addition to, accelerator pedal position to compare to a corresponding threshold or thresholds to determine whether to control the engine and motor to rev the engine as indicated at 240 or to charge the battery as indicated at 230.

The engine and/or motor may be controlled to provide a desired or target impeller speed as indicated at 242. Increasing the torque converter impeller speed relative to the turbine speed increases the torque multiplication through the torque converter to provide increased launch torque to the vehicle wheels. This may also allow the drive to spin or squeal the tires if traction control or similar features are not provided or are disengaged. The engine may be operated in speed control mode as indicated at 244 so that the engine speed responds to changes in accelerator pedal position to allow the driver to rev the engine. The motor may be operated in torque control mode as represented at 246.

Figure 3A:
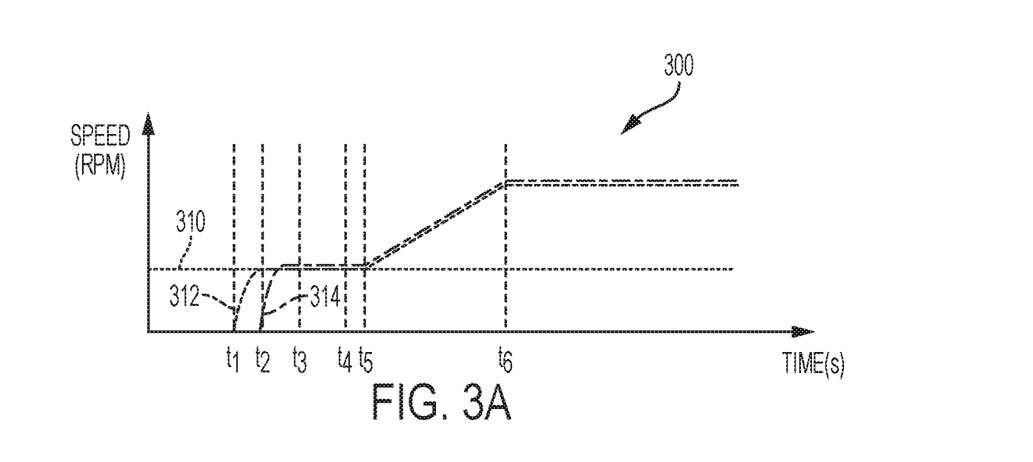
FIGS. 3A-3C are graphs illustrating operation of a representative embodiment of a vehicle with accelerator pedal control of engine speed for engine revving with the transmission in park or neutral.
Figure 3B:
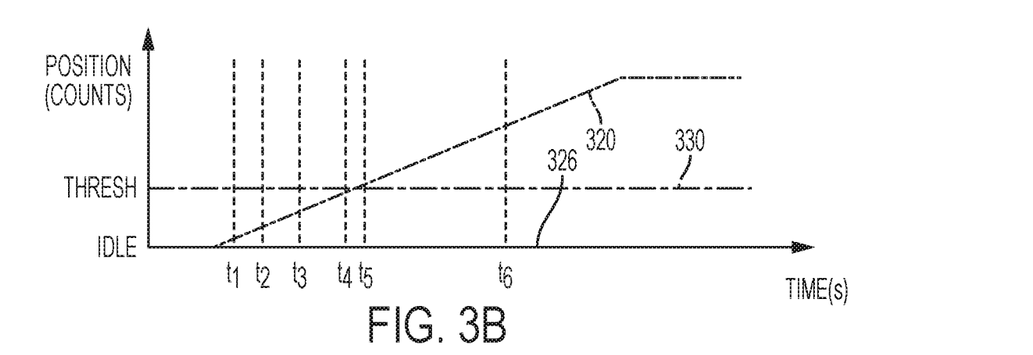
Figure 3C:
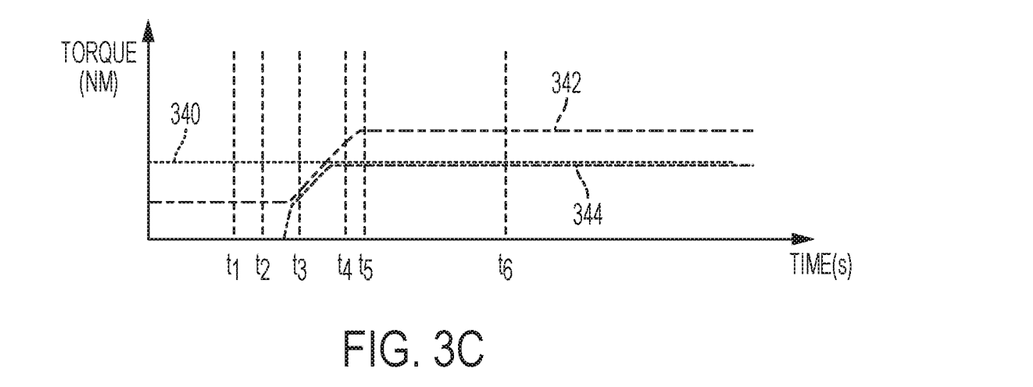

FIGS. 3A-3C illustrate the response 300 of a representative embodiment of a system or method for vehicle control as a driver progressively applies the accelerator pedal from an idle position past a threshold to a maximum position as a function of time. The graphs illustrate a representative set point for idle speed 310 as well as the response of motor speed 312 and engine speed 314 in FIG. 3A. FIG. 3B illustrates accelerator pedal position 320 relative to an idle position 326 and a threshold 330. FIG. 3C illustrates battery energy management torque parameters including a desired energy management torque 340, a maximum energy management torque limit 342, and a requested energy management torque 344. At time $t_1$ the accelerator pedal position 320 is above the idle position 326 and the motor speed 312 begins to increase and the disconnect clutch is engaged to start or pull-up the engine at time $t_2$ where engine speed begins to increase to idle speed 310. Motor torque increases at time $t_3$ to charge the battery to time $t_4$ as accelerator pedal position 320 remains below threshold 330. At time $t_4$, the motor torque satisfies the desired energy management torque 340 to charge the battery and is maintained at the desired energy management torque.

In some embodiments, the vehicle may include an engine starter motor that may be selectively engaged to start the engine. In these embodiments, the disconnect clutch may remain open or only partially engaged until the engine reaches a minimum starting speed threshold. As such, the engine speed would increase to idle speed before the traction motor speed increases. The traction motor speed would increase to idle speed after the disconnect clutch is engaged or locked.

As illustrated in FIGS. 3A-3C, engine speed and motor speed remain at idle speed 310 until time t5 where accelerator pedal position 320 crosses an associated threshold 330. Threshold 330 may vary based on current vehicle and ambient operating conditions in some embodiments. Threshold 330 may also vary by application, battery capacity, elapsed time in PARK or NEUTRAL, etc. As previously described, accelerator pedal position 320 may be used to determine or calculate an accelerator pedal position rate of change that may be compared to a corresponding threshold to control engine revving or battery charging in some embodiments.

In response to accelerator pedal position 320 exceeding threshold 330, motor speed 312 and engine speed 314 increase above idle speed 310 to allow the driver to rev the engine in response to the accelerator pedal position 320 subject to a maximum speed limit as indicated at time $t_6$. The maximum speed limit may be lower in the PARK or NEUTRAL mode than the engine redline or fuel cut-off limit. The engine may be operated in torque control mode with the motor operated in speed control mode prior to time $t_5$ where the accelerator pedal position 320 exceeds threshold 330. At time $t_5$, the engine may transition to speed control mode with the motor transitioning to torque control mode. Increasing the motor and engine speed with the disconnect clutch locked or at least partially engaged may be used to control torque converter impeller speed to provide additional launch torque to the vehicle wheels.

Figure 4A:
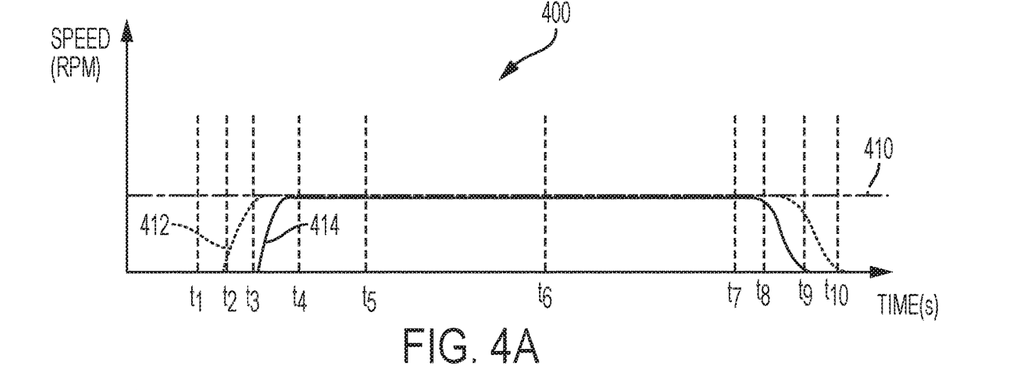
FIGS. 4A-4C illustrate operation of a representative embodiment of a vehicle with accelerator pedal control of engine speed for traction battery charging with the transmission in park or neutral.
Figure 4B:
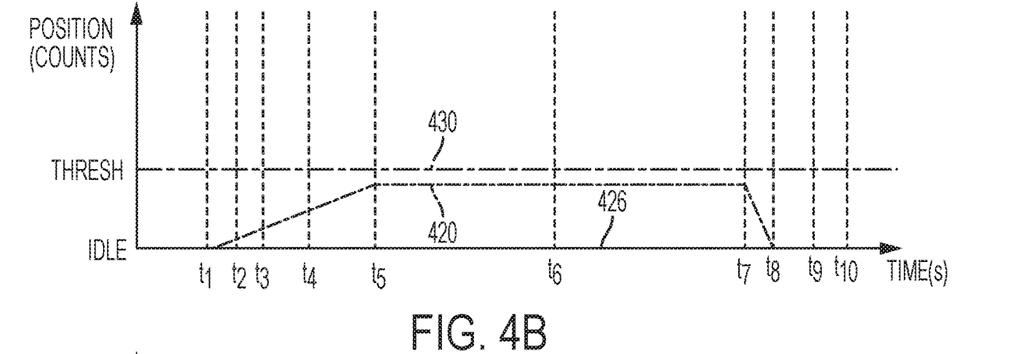
Figure 4C:
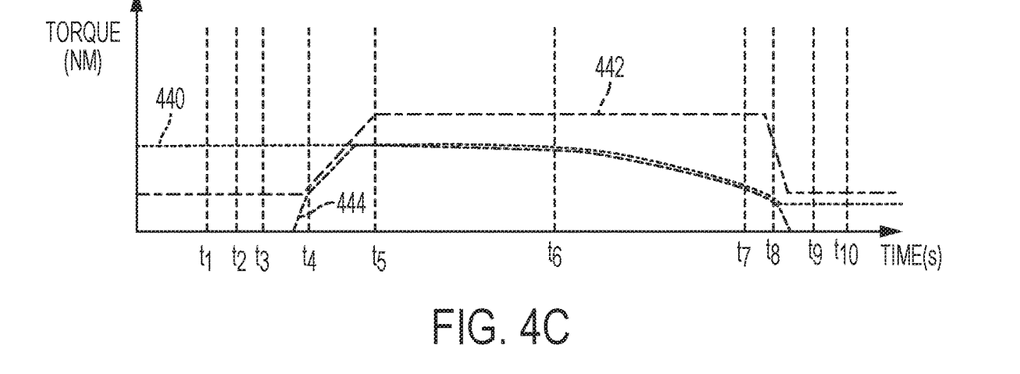

FIGS. 4A-4C illustrate the response 400 of a representative embodiment of a vehicle in PARK or NEUTRAL as a driver lightly applies the accelerator pedal. FIG. 4A illustrates a desired or set idle speed 410 relative to motor speed 412 and engine speed 414 as a function of time. The target idle speed 410 may vary based on vehicle or ambient operating conditions. Accelerator pedal position 420 relative to an idle position 426 and a threshold 430 is illustrated in FIG. 4B. Energy management torque parameters are illustrated in FIG. 4C including a desired energy management torque 440, a maximum energy management torque limit 442 and a requested energy management torque 444 that decreases as battery state of charge (SOC) increases.

Accelerator pedal position 420 begins to increase above the idle position 426 at time $t_1$ with the motor speed increasing at time $t_2$. The disconnect clutch is at least partially engaged to pull-up or start the engine at time $t_3$ and engine speed 414 increases to idle speed 410. At time $t_4$, the engine and motor are controlled to begin charging the traction battery and increase the energy management torque to the requested torque 440. Accelerator pedal position 430 stops increasing and is held substantially constant at time $t_5$ as the battery is more aggressively charged subject to various limits, such as charging current, temperature, etc. At time $t_6$, the desired energy management torque 440 and requested energy management torque 444 begin to decrease based on current operating conditions, such as battery SOC, for example, while accelerator pedal position 420 remains steady below threshold 430. Likewise, motor speed 412 and engine speed 414 remain at idle speed 410.

The driver begins releasing the accelerator pedal at time $t_7$ with the accelerator pedal position returning to the idle position 426 at $t_8$. The engine may also be stopped at t8 in response to the accelerator pedal position 420 returning to the idle position 426 such that engine speed 414 returns to zero at time $t_9$ followed by motor speed 412 returning to zero at time $t_{10}$. In some embodiments, the engine may be stopped a predetermined time after the accelerator pedal position 420 returns to the idle position 426. As generally illustrated in FIGS. 4A-4C, the engine may be operated in a torque control mode with the motor operating in a speed control mode such that the engine provides the desired energy management torque to the motor (operating as a generator) to charge the traction battery.

As demonstrated by the representative embodiments illustrated and described, various embodiments according to the disclosure may provide one or more advantages. For example, systems or methods for a vehicle having a step-ratio transmission, engine, and M/G according to various embodiments allow the driver additional control of the powertrain including enhanced control of engine speed and traction battery charging while the transmission is in PARK or NEUTRAL. Various embodiments interpret accelerator pedal position and/or rate of change of position based on a gear selector or transmission state for a step-ratio transmission selecting PARK or NEUTRAL to facilitate engine speed control or torque control in response to accelerator pedal position. Similarly, one or more electric machines may be operated in a torque control mode or speed control mode based on accelerator pedal position while the gear selector is in PARK or NEUTRAL to modify traction battery charging subject to operating condition limits. Vehicle control according to various embodiments allows driver control of engine revving, transmission shifting or engagement with engine speed above idle speed, and battery charging with engine speed above idle speed While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle having an engine, an electric machine, a traction battery, and a step-ratio transmission, comprising:
   a controller programmed to, while the transmission is in PARK or NEUTRAL:
   start the engine and control engine torque responsive to accelerator pedal position exceeding idle position and being below a revving position to charge the battery by the electric machine; and
   control engine speed responsive to the accelerator pedal position being above the revving position to rev the engine.

2. The vehicle of claim 1 further comprising a clutch disposed between the engine and the electric machine, the controller further programmed to lock the clutch responsive to the accelerator pedal position exceeding the idle position.

3. The vehicle of claim 2, the controller further programmed to engage the clutch after the engine starts.

4. The vehicle of claim 2, the controller further programmed to engage the clutch after engine speed exceeds an associated starting threshold.

5. The vehicle of claim 1, the controller further programmed to stop the engine in response to accelerator pedal position returning to the idle position for a predetermined period of time.

6. The vehicle of claim 1, the controller further programmed to control the engine torque based on a battery state of charge (SOC) while the accelerator pedal position is below the revving threshold.

7. The vehicle of claim 1, the controller further programmed to control transmission torque converter impeller speed based on the accelerator pedal position while the accelerator pedal position exceeds the revving threshold.

8. The vehicle of claim 7, the controller further programmed to control electric machine speed to provide a target impeller speed based on the accelerator pedal position while the accelerator pedal position exceeds the revving threshold.

9. A vehicle control system comprising:
a controller programmed to,
while a transmission is in PARK or NEUTRAL, start an engine, close a disconnect clutch selectively coupling the engine to an electric machine, and control the electric machine to charge a traction battery in response to an accelerator pedal position exceeding an idle position and being less than a first threshold, and
controlling transmission impeller speed in response to accelerator pedal position exceeding the first threshold.

10. The system of claim 9 wherein the controller is further programmed to control engine torque while the accelerator pedal position is less than the first threshold and to control engine speed while the accelerator pedal position is greater than the first threshold to facilitate engine revving.

11. The system of claim 9 wherein the controller is further programmed to stop the engine in response to the accelerator pedal position returning to the idle position for a predetermined period of time.

12. The system of claim 9 wherein the transmission comprises a step-ratio transmission.

13. The system of claim 9 wherein the controller operates the engine in a torque control mode and the electric machine in a speed control mode while the accelerator pedal position exceeds the idle position and is less than the first threshold.

14. The system of claim 9 wherein the controller is further programmed to control the engine and the electric machine based on a state of charge of the traction battery while the accelerator pedal position is less than the first threshold.

15. A method for controlling a vehicle having an engine, a step-ratio transmission, an electric machine, and a battery, comprising:
by a controller:
starting the engine, closing a clutch between the engine and the electric machine, and controlling the engine and the electric machine to: charge the battery while the transmission is in PARK or NEUTRAL when accelerator pedal position is between an idle position and a revving threshold; and to rev the engine while the transmission is in PARK or NEUTRAL when the accelerator pedal position is above the revving threshold, wherein the engine is controlled in an engine torque control mode while charging the battery and an engine speed control mode while revving the engine.

16. The method of claim 15 further comprising:
controlling the engine and the electric machine based on a target torque converter impeller speed.

17. The method of claim 15 further comprising stopping the engine after the accelerator pedal position remains at the idle position for a predetermined period of time.

18. The method of claim 15 further comprising controlling the engine and the electric machine to charge the battery in response to a rate of change of the accelerator pedal position being less than an associated rate threshold; and to rev the engine in response to the rate of change being greater than or equal to the associated rate threshold.

* * * * *